US012350762B2

(12) United States Patent
Liu et al.

(10) Patent No.: US 12,350,762 B2
(45) Date of Patent: Jul. 8, 2025

(54) SYSTEMS AND METHODS FOR HEIGHT CONTROL IN LASER METAL DEPOSITION

(71) Applicant: Illinois Tool Works Inc., Glenview, IL (US)

(72) Inventors: Shuang Liu, Appleton, WI (US); Richard M. Hutchison, Appleton, WI (US); Erik Miller, Verona, WI (US)

(73) Assignee: Illinois Tool Works Inc.

( * ) Notice: Subject to any disclaimer, the term of this patent is extended or adjusted under 35 U.S.C. 154(b) by 992 days.

(21) Appl. No.: 16/909,344

(22) Filed: Jun. 23, 2020

(65) Prior Publication Data
US 2020/0398363 A1 Dec. 24, 2020

Related U.S. Application Data

(60) Provisional application No. 62/865,579, filed on Jun. 24, 2019.

(51) Int. Cl.
*B23K 9/04* (2006.01)
*B23K 9/095* (2006.01)
(Continued)

(52) U.S. Cl.
CPC ............ *B23K 9/044* (2013.01); *B23K 9/0953* (2013.01); *B23K 9/1093* (2013.01); *B23K 9/125* (2013.01);
(Continued)

(58) Field of Classification Search
CPC ... B23K 11/253; B23K 11/258; B23K 11/314; B23K 26/342; B23K 9/04; B23K 9/042; B23K 9/0737; B23K 9/0956; B23K 9/125; B23K 9/126; B23K 9/173; B23K 9/044; B23K 9/0953; B23K 9/1006; B23K 9/1093; B33Y 10/00; B33Y 30/00; B33Y 40/00; B33Y 50/00; B33Y 50/02; Y02P 10/25;
(Continued)

(56) References Cited

U.S. PATENT DOCUMENTS 9,085,041 B2 * 7/2015 Peters .................... B23K 9/125
11,772,194 B2 * 10/2023 Yamasaki ............... B22F 10/36
700/98

(Continued)

OTHER PUBLICATIONS

EP3831525 (Year: 2023).*

(Continued)

*Primary Examiner* — Steven W Crabb
*Assistant Examiner* — Frederick F Calvetti
(74) *Attorney, Agent, or Firm* — MCANDREWS HELD & MALLOY

(57) ABSTRACT

Disclosed is a welding system configured to perform additive manufacturing, particularly a welding system to achieve a stable a laser metal deposition with hot wire process by controlling the contact point between the welding wire and the workpiece. For example, the resistance of the stick-out wire is measured and the measured resistance is converted to a distance signal, which can then be used for comparison to a desired distance. The distance between the contact tip and the workpiece can then be adjusted based on the comparison. The present disclosure also relates to using a constant enthalpy system to determine and control the contact tip to workpiece distance.

21 Claims, 11 Drawing Sheets

(51) Int. Cl.
  *B23K 9/10* (2006.01)
  *B23K 9/12* (2006.01)
  *B23K 26/348* (2014.01)
  *B33Y 30/00* (2015.01)
  *B33Y 50/00* (2015.01)

(52) U.S. Cl.
  CPC ............ *B23K 9/126* (2013.01); *B23K 26/348* (2015.10); *B33Y 30/00* (2014.12); *B33Y 50/00* (2014.12)

(58) Field of Classification Search
  CPC .......... B22F 10/22; B22F 10/25; B22F 10/38; B22F 12/22; B22F 10/20; B22F 10/30; H02M 1/00
  USPC ...................................... 219/76.14
  See application file for complete search history.

(56) References Cited

U.S. PATENT DOCUMENTS

| | | | |
|---|---|---|---|
| 2013/0043219 A1* | 2/2013 | Peters ................. | B23K 9/0671 219/72 |
| 2015/0083702 A1* | 3/2015 | Scott ...................... | B23K 9/095 219/148 |
| 2015/0343551 A1* | 12/2015 | Davidson ................ | B23K 9/10 219/130.1 |
| 2019/0184486 A1* | 6/2019 | Flamm .................... | B22F 12/22 |
| 2023/0001514 A1* | 1/2023 | Heralic ............... | B23K 15/0086 |
| 2023/0347413 A1* | 11/2023 | Ansell ............... | B23K 15/0093 |

OTHER PUBLICATIONS

CN109128437 (Year: 2023).*
JP2005224814 (Year: 2023).*
CN103737163 (Year: 2023).*
Hagqvist et al (Apr. 10, 2015) (Year: 2015).*
Hagqvist et al (Mar. 1, 2014) (Year: 2014).*
Int'l Search Report and Written Opinion ApplN No. PCT/US2020/039160 mailed Sep. 22, 2020.

* cited by examiner

SYSTEMS AND METHODS FOR HEIGHT CONTROL IN LASER METAL DEPOSITION

CROSS REFERENCE TO RELATED APPLICATIONS

The present application claims the benefit of U.S. Provisional Patent Application Ser. No. 62/865,579 filed Jun. 24, 2019, entitled "Systems And Methods For Height Control In Laser Metal Deposition." The entire contents of U.S. Provisional Patent Application Ser. No. 62/865,579 are expressly incorporated herein by reference.

BACKGROUND

Additive manufacturing is a process that deposits material in a layered fashion to build up a part into a particular geometry. Laser metal deposition ("LMD") is an additive manufacturing process in which a laser beam forms a molten pool on a metallic substrate, into which filler metal is fed. LMD may use powder based processes or wire based processes. Some laser deposition with wire processes involves preheating the deposited wire.

SUMMARY

The present disclosure relates generally to additive manufacturing systems, and more particularly to laser metal deposition with hot wire systems, substantially as illustrated by and described in connection with at least one of the figures, as set forth more completely in the claims.

DRAWINGS

The figures are not necessarily to scale. Where appropriate, similar or identical reference numbers are used to refer to similar or identical components.

DETAILED DESCRIPTION

Figure 1:
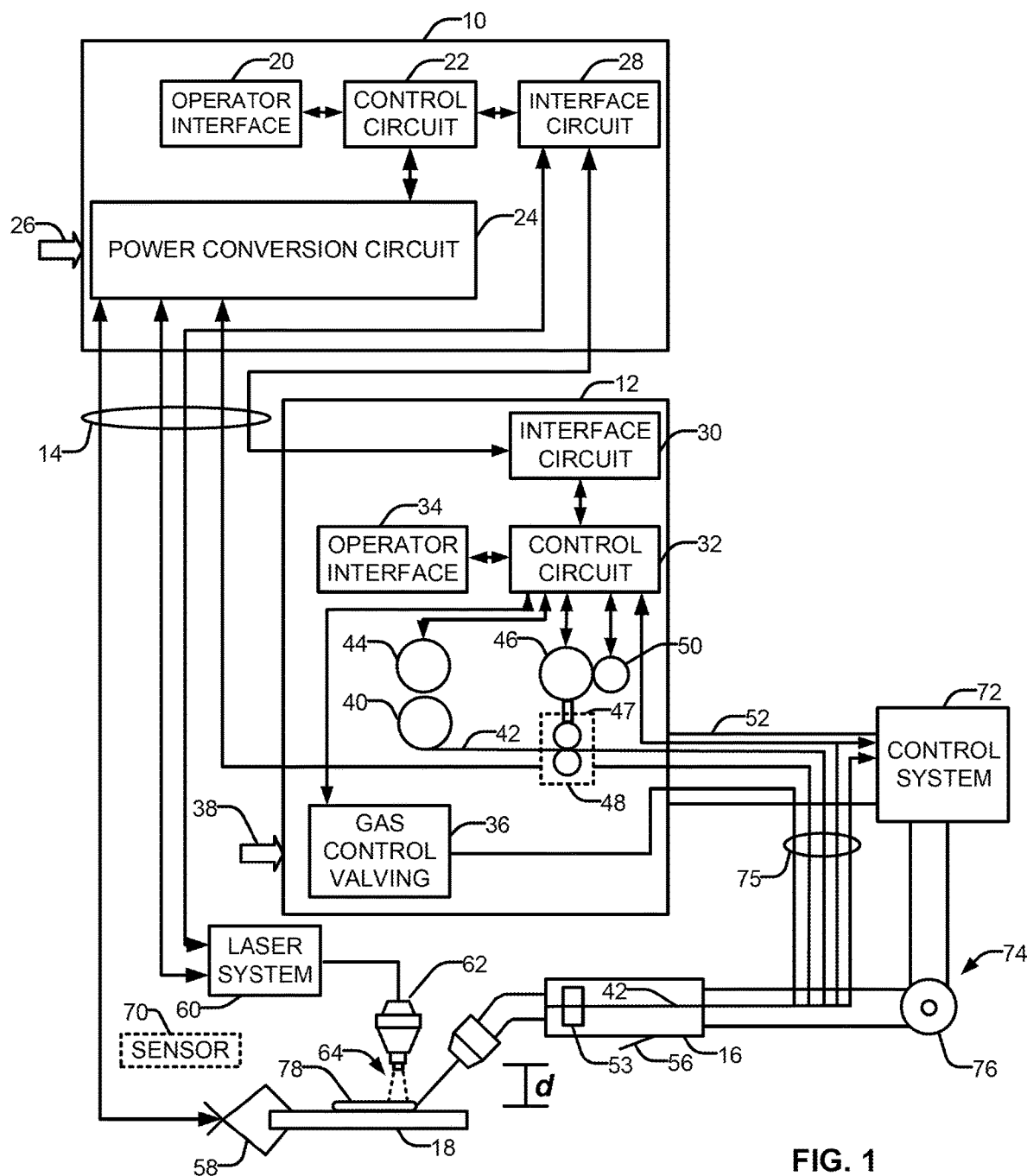
FIG. 1 illustrates an additive manufacturing system employing a laser metal deposition with wire welding process to create a multilayer part, in accordance with aspects of this disclosure.

The present disclosure describes systems and methods for forming a multilayered part by additive manufacturing techniques including laser metal deposition ("LMD") and laser metal deposition with hot wire ("LMD-HW"). An additive manufacturing system employs sensor data and stored geometric models in conjunction with welding processes to build up the part by application material into a series of layers.

Additive manufacturing is any of various processes in which material is joined or solidified under computer control to create a three-dimensional object, with material being added together in a layered fashion. For example, three-dimensional (3D) printing is used in both rapid prototyping and additive manufacturing using technologies such as stereolithography (SLA) or fused deposit modeling (FDM).

Through additive manufacturing techniques, objects of almost any shape or geometry can be created, typically by use of a digital three-dimensional model. Traditional techniques for creating an object like injection molding can be less expensive for the manufacture of some products in high quantities. By contrast, additive manufacturing may be faster, more flexible and/or less expensive when producing fewer parts. Thus, additive manufacturing systems give designers and manufacturers the ability to produce parts and concept models in less time with greater flexibility. Thus, unlike material removed from a stock in conventional machining processes, additive manufacturing builds a three-dimensional object from a computer-aided design (CAD) model or Additive Manufacturing File Format (AMF) file, usually by successively adding material (e.g., an electrode wire) layer by layer.

LMD is an additive manufacturing process in which a laser beam forms a molten pool on a metallic substrate, into which filler metal is fed. In LMD, powder is the most widely used deposition material because powder provides a flexible and robust process. However, powder based processes have been developed towards the manufacture of small and complex geometries. Using wire as a deposition material is a less common but useful technique. Wire deposition material is especially useful in the manufacturing of large structures. Compared to powder, wire deposition has several advantages, including near 100% utilization of material, good out-of-position tolerance, better surface finish, high deposition rate, cleaner work environment, and lower cost of materials.

A common issue for laser metal deposition with wire ("LMD-W") is that LMD-W involves strict tolerance of processing parameters, such as wire position and orientation relative to laser beam and weld puddle, wire feeding rate, etc. LMD-HW, developed from LMD-W, can improve the stability and productivity of the wire deposition process. In LMD-HW, the laser energy is mainly used to melt the substrate surface to form the metallurgical bond while resistive heat is used to preheat the filler welding wire. Resistance power is typically less expensive than laser power, and therefore the external resistance preheating of the welding wire to be deposited results in using more 'cheap' electricity and less 'expensive' laser power.

A common issue with LMD-HW is maintaining a stable deposition process. Positioning of the wire relative to the laser and weld puddle is valuable to maintaining a stable deposition process. If a change in distance between contact tip and weld puddle occurs, problems such as droplet-building during the metal transfer to the weld puddle, or by contrast, stubbing of the wire tip against the former layer may occur. Real-time control of contact tip-to-workpiece distance (e.g., height) is therefore important to ensure the process stability. Several ways have been developed to measure and control the contact tip to workpiece distance, such as X-ray, infrared sensor, spectrometer, etc.

The present disclosure relates to measuring the resistance of the stick-out wire and converting the measured resistance to a distance signal, which can then be used for controlling the distance between the contact tip and the workpiece. The present disclosure also relates to using a constant enthalpy system to determine and control the contact tip to workpiece distance.

In disclosed examples, an additive manufacturing system includes an additive manufacturing tool configured to advance an electrode wire to a weld puddle on a surface of a workpiece, a heater configured to preheat the electrode wire below a melting temperature of the electrode wire at a location in an electrode wire feed path that is prior to the surface, a laser generator to provide a laser beam to create and heat the weld puddle to at least the melting temperature of the electrode wire, and a control circuitry. The control circuitry is configured to monitor a current or a voltage associated with the electrode wire, determine a resistance of the electrode wire based in part on the current or the voltage, determine a distance between the tool and the surface based in part on the resistance, and control a position of the tool to adjust the distance between the tool and the surface based on the resistance.

In some examples, the control circuitry further configured to compare the distance against one or more threshold distances, and control the position of the tool based the comparison. In examples, the one or more threshold distances are based on a predetermined range of angles measured between the electrode wire and the surface of the workpiece. In examples, the predetermined range of angles includes a 45-degree angle. In examples, the determined resistance corresponds to a resistance of a length of the electrode wire that extends from the contact tip to the surface In some examples, the resistance is determined based in part on a predetermined wire resistance or a resistance between the wire and contact tip resulting from electrical contact between the electrode wire and the contact tip. In examples, the resistance is determined based on a property of the electrode wire, the property of the electrode wire comprising a wire diameter, a wire resistivity, or a wire temperature. In examples, the surface is an exposed surface of a layer of a multi-layer part being formed by the additive manufacturing system.

In some examples, the additive manufacturing tool comprises a contact tip, the distance representing a linear distance normal to the surface between the contact tip and the surface. In some examples, the control circuitry further configured to determine a length of the electrode wire that extends from the contact tip to the surface. In some examples, the control circuitry further configured to control the position or the orientation of the tool to adjust the distance between the tool and the surface based on the length.

In some examples, the control circuitry is further configured to receive one or more three-dimensional models of a multi-layer part, and adjust an operational characteristic of the system based on one or more of the three-dimensional models. In some examples, the operational characteristic comprises a wire feed speed, a wire feed direction of the wire feeder motor, a travel speed, a power output, a process mode, a deposition path, a deposition sequence, or a tool angle, based on one or more of the three-dimensional models.

In disclosed examples, a manufacturing system to perform a welding or cladding operation, the system including a manufacturing tool configured to advance an electrode wire to a weld puddle on a surface of a workpiece, a heater configured to preheat the electrode wire below a melting temperature of the electrode wire at a location in an electrode wire feed path that is prior to the surface, a laser generator to provide a laser beam to create and heat the weld puddle to at least the melting temperature of the electrode wire, and a control circuitry. The control circuitry is configured to monitor a current or a voltage associated with the electrode wire, determine a resistance of the electrode wire based in part on the current or the voltage, determine a distance between the tool and the surface based in part on the resistance, and control a position of the tool to adjust the distance between the tool and the surface based on the resistance.

In some examples, the control circuitry is further configured to compare the distance to one or more threshold distance values associated with a desired current or voltage value, determine a distance error value based on the comparison; and adjust the distance between the tool and the surface to reduce the distance error value.

In examples, the additive manufacturing tool comprises a contact tip, the distance representing a linear distance normal to the surface between the contact tip and the surface, the control circuitry is further configured to determine a length of the electrode wire that extends from the contact tip to the surface, and control the position or the orientation of the tool to adjust the distance between the tool and the surface based on the length.

In disclosed examples, additive manufacturing system, including an additive manufacturing tool configured to advance an electrode wire to a weld puddle on a surface of a workpiece, a heater configured to preheat the electrode wire below a melting temperature of the electrode wire at a location in an electrode wire feed path that is prior to the surface, a laser generator to provide a laser beam to heat the weld puddle to at least the melting temperature of the electrode wire, and a closed loop control circuitry to maintain an enthalpy value in a portion of the electrode wire between the tool and the surface within a predetermined threshold enthalpy value. The control circuitry is configured to determine a desired current to maintain the enthalpy value within the predetermined threshold enthalpy value at a threshold distance of the tool from the surface, calculate a current error value based on a comparison of a current feedback signal and the desired current, and adjust a distance of the tool from the surface of the workpiece to reduce the current error value.

In some examples, the predetermined threshold enthalpy value is based on one or more operating characteristics of the system. In examples, the one or more operating characteristic is determined based upon an operator input. In examples, the one or more operating characteristic comprises a welding process or an electrode wire type. In some examples, the control circuitry is further configured to adjust an angle of the tool relative to the surface to reduce the current error value.

As used herein, the term "additive manufacturing", is a manufacturing process in which material is joined or solidified under computer control to create a three-dimensional object, with material being added together in a layered fashion.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit" or "circuitry" includes any analog and/or digital components, power and/or control elements, such as a microprocessor, digital signal processor (DSP), software, and the like, discrete and/or integrated components, or portions and/or combinations thereof.

As used herein, the term "pulsed welding" or "pulsed MIG welding" refers to techniques in which a pulsed power waveform is generated, such as to control deposition of droplets of metal into the progressing weld puddle.

As used herein, the term "boost converter" is a converter used in a circuit that boosts a voltage. For example, a boost converter can be a type of step-up converter, such as a DC-to-DC power converter that steps up voltage while stepping down current from its input (e.g., from the starter battery) to its output (e.g., a load and/or attached power bus). It is a type of switched mode power supply.

As used herein, the term "buck converter" (e.g., a step-down converter) refers to a power converter which steps down voltage (e.g., while stepping up current) from its input to its output.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), flash memory, solid state storage, a computer-readable medium, or the like.

As used herein, the term "torch," "tool" or "welding-type tool" can include a hand-held or robotic welding torch, gun, or other device used to create the welding arc.

FIG. 1 illustrates an example laser welding system for LMD-HW welding operations to create objects by additive manufacturing techniques. As shown in the LMD-HW welding system of FIG. 1, a power supply 10 and a wire feeder 12 are coupled via conductors or conduits 14. In the illustrated example, the power supply 10 is separate from the wire feeder 12, such that the wire feeder may be positioned at some distance from the power supply near a welding location. However, in some examples the wire feeder may be integrated with the power supply 10. In such cases, the conduits 14 would be internal to the system. In examples in which the wire feeder 12 is separate from the power supply 10, terminals are typically provided on the power supply 10 and on the wire feeder 12 to allow the conductors or conduits to be coupled to the systems so as to allow for power and gas to be provided to the wire feeder 12 from the power supply 10, and to allow data to be exchanged between the two devices.

The system is configured to provide wire, power, and shielding gas to an additive manufacturing tool or welding torch 16. The tool 16 may be of many different types, and may allow for the feed of a welding wire 42 and gas to a location adjacent to a substrate or platform 18 upon which a part 78 is to be formed. In some examples, a second conductor may be run to the welding workpiece so as to complete an electrical circuit between the power supply and the workpiece.

The welding system is configured for data settings to be selected by the operator and/or a welding sequence, such as via an operator interface 20 provided on the power supply 10. The operator interface 20 will typically be incorporated into a front faceplate of the power supply 10, and may allow for selection of settings such as the weld process, the type of wire to be used, voltage and current settings, and so forth. In particular, the system is configured to allow for welding with various steels, aluminums, or other welding wire that is channeled through the tool 16. Further, the system is configured to employ welding wires with a variety of cross-sectional geometries (e.g., circular, substantially flat, triangular, etc.). These weld settings are communicated to a control circuitry 22 within the power supply. The system may be particularly adapted to implement welding regimes configured for certain welding wire types.

Additionally or alternatively, process instructions for additive manufacturing can be provided via a weld sequence program, such as stored on a memory accessible to a processor/control circuitry 22 associated with the power supply 10. In such a case, the sequencer can employ stored information (e.g., associated with a desired product configuration and/or process, including historical data), and/or customizable by a user. For instance, information associated with a particular design (e.g., one or more three-dimensional models and/or thermal profiles associated with the part 78, material characteristics, system control parameters, etc.) corresponding to the part 78 can be stored in a memory and/or provided via a network interface, as described in greater detail with respect to FIG. 5. Thus, the information can be used to control operation of the system to facilitate formation of the part 78, such as by controlling a power output from the power supply 10, wire feeder motors 48, 53, robotic system 72, laser system 60, etc.

In this manner, the system and/or the control circuitry 22 controls formation of the part 78 by adjusting one or more operational characteristics of the system during the additive manufacturing process. The operational characteristics may include, but are not limited to, wire feed speed, wire feed direction, travel speed, power output, process mode, deposition path, deposition sequence, torch angle, torch height, etc.

Additionally, a sensor(s) 70 can measure operational parameters associated with operation of the system (e.g., current, voltage, inductance, phase, power, speed, acceleration, orientation, position, etc.). The sensed operational characteristic (e.g., voltage, current, orientation, temperature, shape, speed, etc.) can be provided to the control circuitry 22 or other controller/control circuitry (e.g., control circuitry 32, a controller associated with the robotic system 72, etc.) to further control the additive manufacturing process.

Based on one or more measured operational parameters (and/or based on a change in the height disclosed herein), the operational characteristics can be adjusted in addition to or in the alternative of the disclosed height control process. In some non-limiting examples, the control circuitry 22 may control the wire feeder 12 to increase or decrease the wire feed speed in order to increase or decrease the amount of wire from the contact tip. In some examples, the control circuitry 22 may control the robotic system 72 to increase or decrease the torch travel speed, which may adjust the location at which the wire 42 enters the weld puddle. In some examples, the control circuitry 22 may control the power supply 10 to increase or decrease the power output to change the amount of heat, adjust the arc length, and/or adjust deposition characteristics during an additive manufacturing operation.

Power from the power supply 10 is applied to the wire electrode 42, typically by a cable 52, to preheat the welding wire 42, such as by applying a relatively low current to resistively heat the welding wire 42 through a circuit formed through the workpiece. Similarly, shielding gas may be fed through the wire feeder and the welding cable 52. During welding operations, the welding wire 42 is advanced through a jacket of the welding cable 52 towards the tool 16. In some examples, within the tool 16, a second wire feeder and/or motor 53 comprises rollers, which may be provided with an associated drive roller, which can be regulated to provide the desired wire feed speed and/or direction.

A robotic system 72 can be employed to regulate movement and position of the tool 16 in accordance with the control circuitry 22, 32, as well as information from sensor (s) 70, for example. In examples, the robotic system 72 may be in communication with the power supply 10, the wire feeder 12 and/or the tool 16 via one or more cables 75. Thus, power and/or information can be provided and/or exchanged via cable 75 to control the additive manufacturing process. In particular, the robotic system 72 can employ one or more arms 74 having one or more actuators 76 (e.g., servo motors, joints, etc.). In this way, the robotic system 72 can command fine control of the attached tool 16 in six degrees of freedom during the welding operation, including travel speed, tool location, distance from the part 78, etc. The robotic system 72 may include one or more sensors to sense operational characteristics, which can be communicated with the control circuitry 22, 32 to further facilitate formation of the part 78.

In some examples, the control circuitry 22, 32 may provide a signal to the wire feeder 12, the power supply 10, the laser system 60, and or the robotic system 72 to enable the additive manufacturing process to be started and stopped in accordance with a particular part design. That is, upon initiation of the process, gas flow may begin, wire may advance, and power may be applied to the cable 52 and through the tool 16 to preheat the advancing welding wire 42, as well as to the laser system 60.

The control circuitry 22 is coupled to power conversion circuit 24. This power conversion circuit 24 is adapted to create the output power to preheat the welding wire 42 and/or power the laser system 60. Various power conversion circuits may be employed, including choppers, boost circuitry, buck circuitry, inverters, converters, and so forth. The configuration of such circuitry may be of types generally known in the art in and of itself. The power conversion circuit 24 is coupled to a source of electrical power as indicated by arrow 26. The power applied to the power conversion circuit 24 may originate in the power grid, although other sources of power may also be used, such as power generated by an engine-driven generator, batteries, fuel cells or other alternative sources. The power supply illustrated in FIG. 1 may also include an interface circuit 28 configured to allow the control circuitry 22 to exchange signals with the wire feeder 12.

The wire feeder 12 includes a complementary interface circuit 30 that is coupled to the interface circuit 28. In some examples, multi-pin interfaces may be provided on both components and a multi-conductor cable run between the interface circuit to allow for such information as wire feed speeds, processes, selected currents, voltages or power levels, and so forth to be set on either the power supply 10, the wire feeder 12, or both.

The wire feeder 12 also includes control circuitry 32 coupled to the interface circuit 30. As described below, the control circuitry 32 allows for wire feed speeds to be controlled in accordance with operator selections or stored sequence instructions, and permits these settings to be fed back to the power supply via the interface circuit. The control circuitry 32 is coupled to an operator interface 34 on the wire feeder that allows selection of one or more welding parameters, particularly wire feed speed. The operator interface may also allow for selection of such weld parameters as the process, the type of wire utilized, current, voltage or power settings, and so forth. The control circuitry 32 may also be coupled to gas control valving 36 which regulates the flow of shielding gas to the torch. In general, such gas is provided at the time of welding, and may be turned on immediately preceding the weld and for a short time following the weld. The gas applied to the gas control valving 36 may be provided in the form of pressurized bottles, as represented by reference numeral 38.

The wire feeder 12 includes components for feeding wire to the welding tool 16 and thereby to the welding application, under the control of control circuitry 32. For example, one or more spools of welding wire 40 are housed in the wire feeder. Welding wire 42 is unspooled from the spools and is progressively fed to the tool 16. The spool may be associated with a clutch 44 that disengages the spool when wire is to be fed to the tool. The clutch 44 may also be regulated to maintain a minimum friction level to avoid free spinning of the spool 40. The first wire feeder motor 46 may be provided within a housing 48 that engages with wire feed rollers 47 to push wire from the wire feeder 12 towards the tool 16.

In practice, at least one of the rollers 47 is mechanically coupled to the motor and is rotated by the motor to drive the wire from the wire feeder, while the mating roller is biased towards the wire to maintain good contact between the two rollers and the wire. Some systems may include multiple rollers of this type. A tachometer 50 or other sensor may be provided for detecting the speed of the first wire feeder motor 46, the rollers 47, or any other associated component so as to provide an indication of the actual wire feed speed. Signals from the tachometer are fed back to the control circuitry 32, such as for continued or periodic monitoring, calibration, etc. In some examples, the system includes a wire spool motor for rotating the wire feeding device, which can be similarly adjusted to increase or decrease the amount of wire between wire feeder motors.

In some examples, the wire feeder 12 can be configured to reverse the direction of the welding wire 42. Moreover, although described as operating with two wire feeders and/or wire feeder motors (e.g., wire feeder motors 46 and 53), the system can operate with a single wire feeding unit to advance and/or reverse wire during formation of the part. Additionally or alternatively, in some examples, one wire feeder may be configured to advance the wire while another wire feeder is configured to reverse the direction of the wire. In this example, one or more control circuits (e.g., control circuitry 22, 32) coordinates operation of the two wire feeders to implement a LMD-HW welding process in an additive manufacturing system, as disclosed herein.

Other system arrangements and input schemes may also be implemented. For example, the welding wire may be fed from a bulk storage container (e.g., a drum) or from one or more spools outside of the wire feeder. Similarly, the wire may be fed from a "spool gun," in which the spool is mounted on or near the welding torch. As noted herein, the wire feed speed settings may be input via the operator input 34 on the wire feeder or on the operator interface 20 of the power supply, or both. In systems having wire feed speed adjustments on the welding torch, this may be the input used for the setting.

In the example of FIG. 1, a laser system 60 can include a laser generator 62 to generate and focus a beam 64 on the surface of the substrate 18. In this manner, the beam 64 can melt the wire 42 to form the part 78, such as by deposition techniques disclosed herein. Industrial lasers, such as laser system 60, are an increasingly popular alternative for welding and surface applications in many fields of manufacturing. Benefits of laser welding include low heat input, a small heat-affected zone, low distortion rate, high welding speeds, and the flexibility of single-sided access.

Although described with respect to a LMD system, the disclosed system may be implemented in conjunction with a variety of technologies to conduct additive manufacturing processes. In but one example, additive manufacturing may employ an arc welding torch to melt material into droplets to build up a layered part in a manner similar to the systems and methods disclosed herein.

As explained in detail with reference to FIGS. 2a, 2b, 2c, 2d and 2e, in LMD-HW positioning of the wire relative to the laser and weld puddle provides the disclosed benefits. A control circuitry (22 or 32) of system may control a position of the torch 16 relative to the beam 64 in order to ensure stability of the LMD-HW process. In particular, the system may control the height d (i.e., a linear distance normal to the horizontal between the contact tip and the workpiece) of the contact tip relative to the workpiece 18.

Figure 2A:
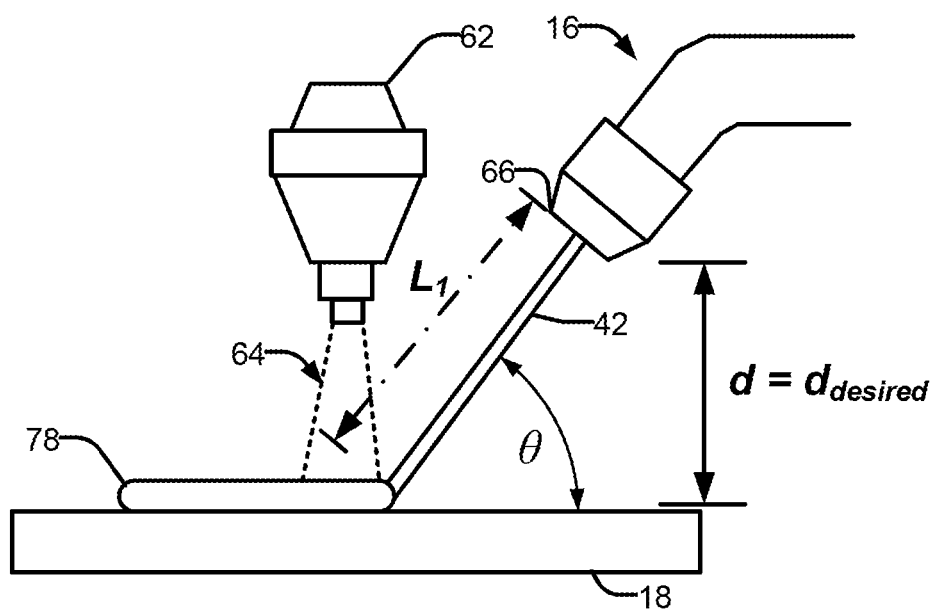
FIG. 2a illustrates a focused view of the additive manufacturing system of FIG. 1, in accordance with aspects of this disclosure.
Figure 2C:
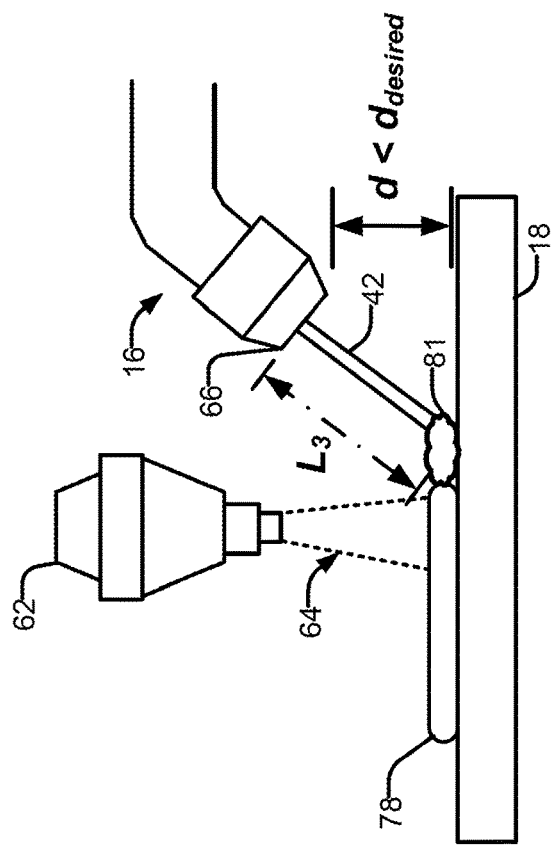
FIG. 2c illustrates yet another focused view of the additive manufacturing system of FIG. 1, in accordance with aspects of this disclosure.
Figure 2B:
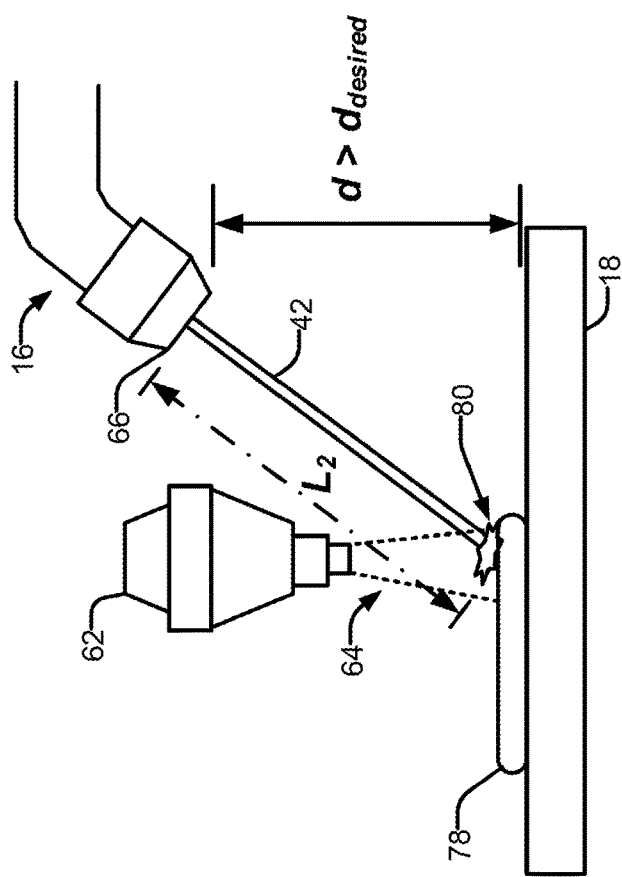
FIG. 2b illustrates another focused view of the additive manufacturing system of FIG. 1, in accordance with aspects of this disclosure.
Figure 2D:
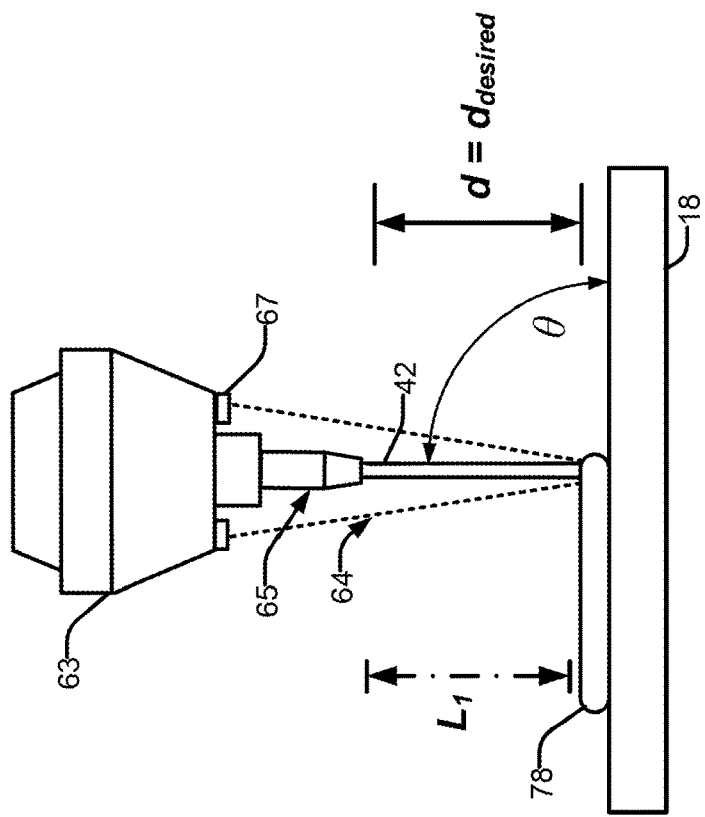
FIG. 2d illustrates yet another focused view of the additive manufacturing system of FIG. 1, in accordance with aspects of this disclosure.
Figure 2E:
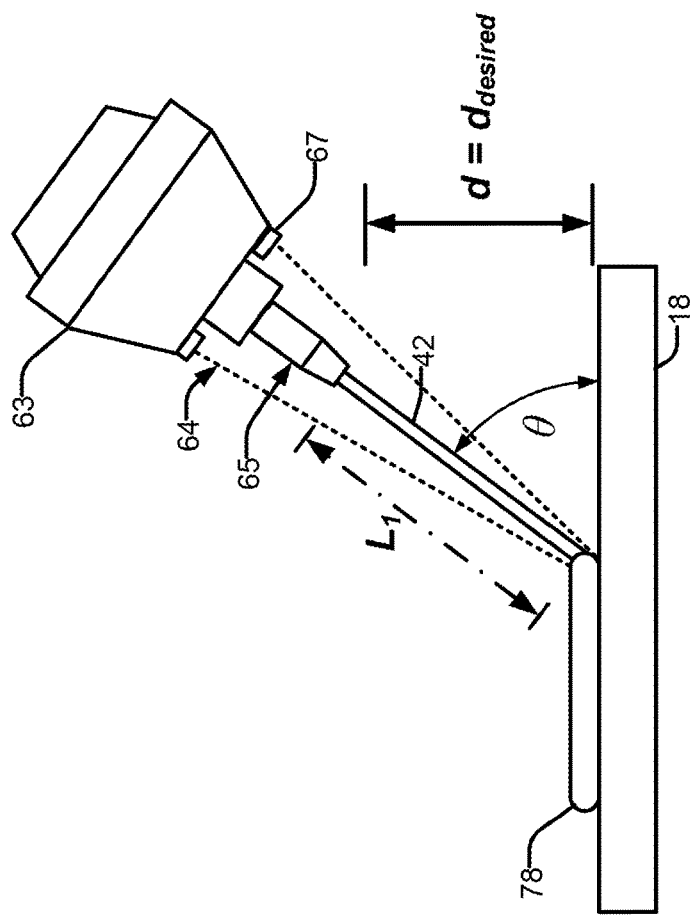
FIG. 2e illustrates yet another focused view of the additive manufacturing system of FIG. 1, in accordance with aspects of this disclosure.

FIGS. 2a, 2b, 2c, 2d and 2e illustrate focused views of the additive manufacturing system of FIG. 1, which illustrate the distance between the contact tip 66 of the torch 16 and the workpiece 18. In LMD-HW, the distance d between the contact tip 66 of the torch 16 and workpiece is helpful in providing a stable process. FIG. 2a illustrates the desirable situation at the distance d=$d_{desired}$, where the stick-out wire 42 meets the workpiece 18 at the rim of the weld puddle. The stick-out wire 42 has a length l, which is $L_1$ in FIG. 2a. As illustrated, there is no direct interaction between laser beam 64 and stick-out wire 42. Although there is some tolerance of the wire position (e.g., ±2 mm in or out of the beam 64), it is difficult to maintain the work distance d in an acceptable range in the LMD-HW process, because any small deviation will be amplified along with the continuous building up of the layers of the part 78. FIGS. 2b and 2c show scenarios where d does not equal $d_{desired}$.

In FIG. 2b, the distance d>$d_{desired}$, which causes the stick-out wire 42 to step into the laser beam 64. The stick-out wire 42 has a length $L_2$. The additional heat from laser beam 64 irradiation melts the stick-out wire 42 tip. As a result, a droplet 80 builds at the stick-out wire 42 tip, and the droplet 80 will eventually grow enough to be pulled down by gravity and disconnect from the stick-out wire 42. The breaking of the droplet 80 from the wire 42 causes the stick-out wire 42 to disconnect from the workpiece 18, which causes an arcing issue and discontinuity of wire feeding into the puddle. In some examples, an alternate path for current can be included in the system disclosed with respect to FIG. 1. For instance, the system can be configured to activate a switch when current increases above a predetermined threshold level, thereby avoiding arcing or other unfavorable conditions.

In FIG. 2c, the stick-out wire 42 has a length $L_3$ and the distance d<$d_{desired}$, which causes the contact point 81 between the stick-out wire 42 and the workpiece 18 to be an undesirable distance from the weld puddle. This separation of the stick-out wire 42 from the weld puddle causes a strong recoiling force on the stick-out wire 42. Consequently, the wire 42 oscillates and wire feeding is not stable. Sometimes an end portion of the stick-out wire 42 is broken by the mechanical force and will not be captured by the weld puddle. The scenarios illustrated in FIGS. 2b and 2c can cause the deposition to be irregularly shaped and can increase the difficulty of depositing a successive layer.

The resistance of the stick-out wire 42 can be used to determine and control the position of the tool 16, and thus the distance d between the contact tip 66 and the workpiece 18. The resistance R of the stick-out wire 42 can be determined by measuring and processing the current I and/or the voltage U of the wire 42. According to Ohm's law:

$$R = \frac{U}{I} \qquad \text{Equation 1}$$

The resistance R of the stick-out wire 42 may depend on the length l, as shown by equation 2, below, where ρ is the resistivity of the wire material and $d_w$ is the diameter of the stick-out wire 42.

$$\frac{R}{l} = \frac{\rho}{\pi(d_w/2)^2} \qquad \text{Equation 2}$$

Further, the relationship between the contact-tip to workpiece height d and the length l of the stick-out wire may also depend on the angle θ between the wire 42 and the workpiece 18, as shown in the equation 3, below. Therefore, the dependence of R on the height d is shown in equation 4, below.

$$\frac{d}{l} = \sin\theta \qquad \text{Equation 3}$$

$$\frac{d}{R} = \frac{\pi(d_w/2)^2}{\rho}\sin\theta \qquad \text{Equation 4}$$

The constants can be set as K as shown in equation 5, below. Since R is the voltage U divided by the current I, the instantaneous torch height $d_i$ for known torch 16 angles θ can be determined based on the ratio of the real-time voltage $U_i$ and current $I_i$ as shown in equation 6, below.

$$\frac{\pi (d_w/2)^2}{\rho} = K \qquad \text{Equation 5}$$

$$d_i = K\sin\theta \frac{U_i}{I_i} \qquad \text{Equation 6}$$

Figure 3:
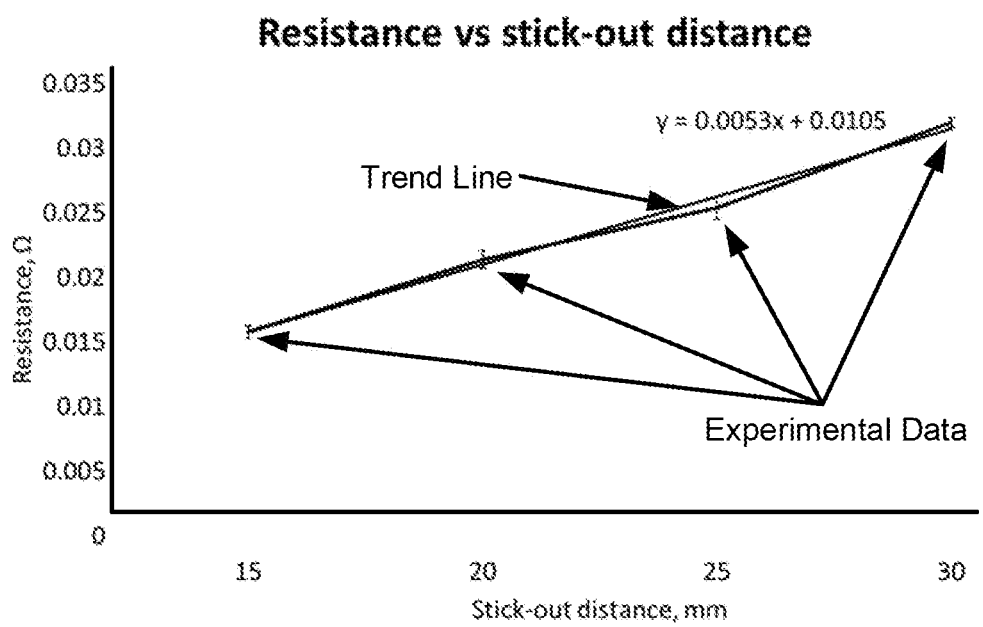
FIG. 3 is a graph showing an exemplary relation between resistance and wire stick-out distance.

Resistivity $\rho$ may be temperature dependent. There also may be limited information regarding resistivity of certain wires. Therefore, experimentation may be performed for some wires to quantize the relationship between wire length l and resistance R. For example, for ER 70S low carbon steel filler metal, the relationship between l and R can be given by the formula of the trend line determined via experimentation, which is shown below and in FIG. 3. Such a trend line can be determined via plotting the stick-out distance versus the measured resistance for a certain wire type, and determining an equation for an estimated line that runs through the experimental data.

$$K = \frac{l}{R} = \frac{l}{0.0053l + 0.0105} \qquad \text{Equation 7}$$

Figure 10:
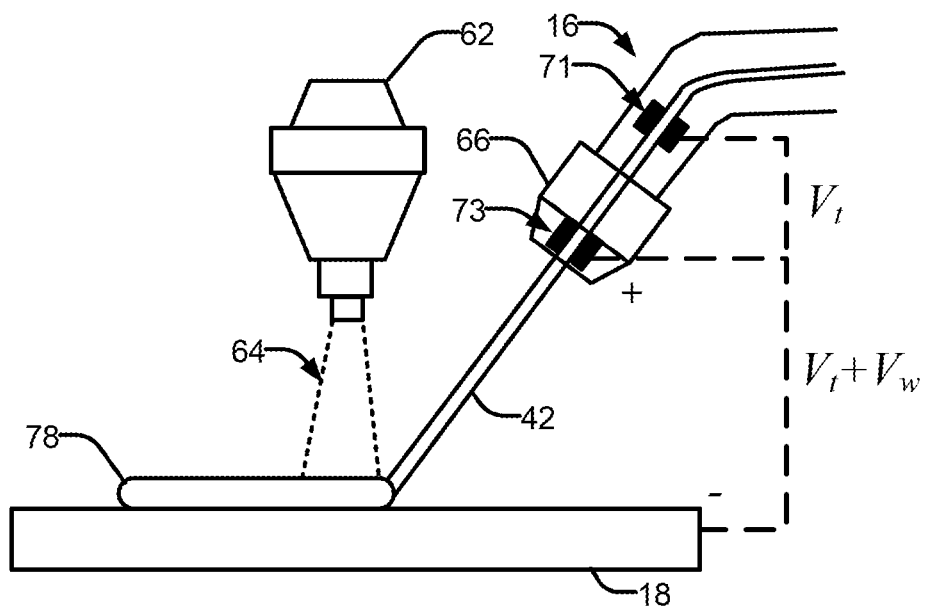
FIG. 10 illustrates a focused view of the additive manufacturing system of FIG. 1, in accordance with aspects of this disclosure.

The measured total resistance R (i.e., measured U/I) is a combination of the resistance $R_w$, which is the resistance of the stick-out wire, $R_c$, which is the circuit resistance, and $R_t$, which is the resistance between the wire and the contact tip. Accordingly, $R=R_w+R_c+R_t$. The total resistance R is independent of the wire feeding rate. $R_c$ is minimal when the sensor 70 leads are connected to the contact tip of the welding tool 16. $R_t$ may slightly change when the contact point between the contact tip 66 and the wire 42 changes. Experimentally, it has been found that total variation of R is less than 3%. In order to further reduce the variation and improve the sensitivity of height change, a technique is employed to measure the contact tip voltage $V_w$. Then the pure wire resistance will be obtained. The setup to get the pure $R_w$ is shown in FIG. 10. For example, a voltage $V_t$ can be measured between the wire 42 in the torch 16 and the contact tip, via electrical contacts 71 and 73. Accordingly, wire length l changes of 1 mm can be determined by measuring the voltage and current, as discussed above. For a 45-degree wire incident angle, the height change d resolution is therefore 0.707 mm.

Figure 4:
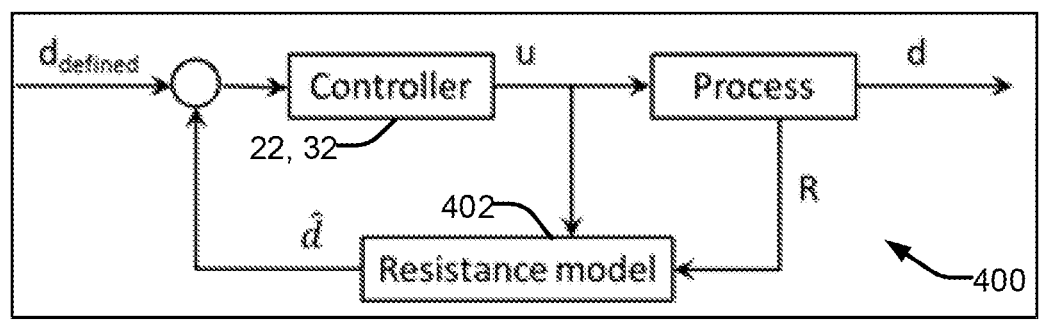
FIG. 4 illustrates a block diagram of a control strategy of the additive manufacturing system of FIG. 1, in accordance with aspects of this disclosure.

FIG. 4 illustrates a control strategy 500 whereby the resistance R can be used to control the height d using the relationships discussed above. The control strategy 400 is a multiple-input, single-output ("MISO") model. The control circuitry 22 or 32 takes inputs u, which include wire type, wire diameter, torch angle, and wire feeding rate. The control circuitry also determines the resistance R by measuring the current I and/or the voltage U. The control circuitry then processes R to determine the distance d using the relationships described above. The control circuitry can then control the robotic system 72 to adjust the height d to bring the height d to $d_{desired}$, which is the desired distance, as described above.

Figure 5:
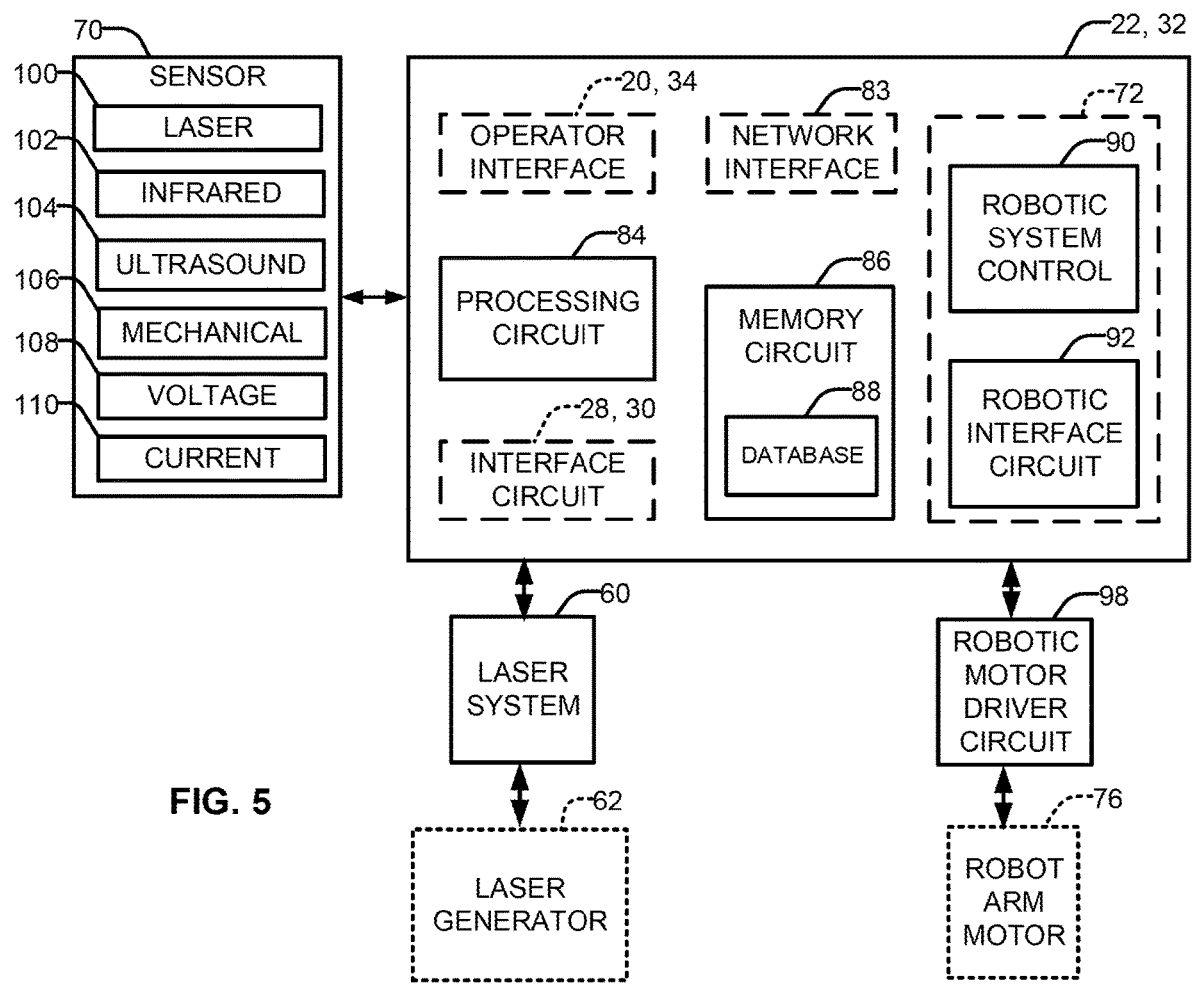
FIG. 5 is a graphical representation of example control circuitry components for an additive manufacturing system of the type shown in FIG. 1, in accordance with aspects of this disclosure.

FIG. 5 illustrates example control circuitry, such as one or both of control circuitry 22, 32, configured to function in a system of the type illustrated in FIG. 1, as well as FIGS. 2a-c and 4. The overall circuitry may include the operator interfaces 20 and 34 and/or interface circuits 28 and 30. For example, the various interfaces can provide communication of operational parameters, including user input and networked information via network interface 83, as well as information from downstream components such as a wirefeeder, a welding torch/tool, and various sensors and/or actuators.

The control circuitry includes a processing circuit 84 which itself may include one or more application-specific or general purpose processors. The processing circuit 84 may be further configured to carry out welding sequences such as corresponding to formation of a particular additive manufacturing part. The processing circuit 84 can receive information regarding the part from a database 88 stored in a memory circuit 86, and/or receive the information from a networked computer and/or a user input. Based on the information, the processing circuit 84 can control and/or coordinate actions of the system components by making computations for implementation of an additive manufacturing process.

The various models and inputs can be correlated based on a number of variables of the additive manufacturing process. For example, geometric features of the three-dimensional model may correspond to a point in time and/or space associated with the process and/or part. For instance, a first or base layer of the part may correspond with an earlier time than a later applied layer. The three-dimensional model may similarly correspond to the process timeline, as well as correspond to the feature of the three-dimensional model at that point in time. The welding sequence can also be synced to the models, to ensure that the welding operation is adjusted to correspond to the requirements of the models.

In some examples, the sensor 70 includes a laser sensor 100 configured to scan the part periodically or continuously during the additive manufacturing process. This scan can be fed back to the processing circuit to compare with the three-dimensional model, to either ensure that the part being formed conforms to the three-dimensional model, and/or to identify variations. Based on the comparison, the processing circuit 84 can adjust one or more operational characteristics of the system to facilitate formation of the part.

Additionally or alternatively, sensor 70 may include an infrared sensor 102, an ultrasound sensor 104, a mechanical sensor 106, which may determine a torch 16 angle θ, a voltage sensor 108, a current sensor 110, to name but a few. Similarly, sensor data from the various sensors can be fed back to the processing circuit 84 for analysis and control of operational characteristics.

In some examples, robotic system 72, which may include a robotic system control 90 and/or robotic interface circuit 92, can be integrated with one or more components of the circuitry, such as control circuitry 22, 32. In other examples, all or part of the robotic system 72 can be located remotely from one or both of the power supply or the wire feeder, and communicate via the robotic interface circuit 92 and one or more of the interface circuits 23, 34, 28, 30, 83.

The robotic system 72 is in communication with the processing circuit 84, as well as the plural interfaces and memory circuit 86. The robotic control system 90 is configured to control operation of the robotic arm 74 via control of a robotic motor drive circuit 98, which controls a robotic arm motor or actuator 76. In this way, the location and/or orientation of the tool 16 is controlled in coordination with data provided by sensors, models, inputs, etc. As a result, geometric features of the part are formed by control of multiple variables that contribute to creation of the part.

Additionally or alternatively, one or more of the interfaces (e.g., interface circuits 28, 30; operator interfaces 20, 34) can provide information corresponding to operational parameters of the system. In this example, operational parameter information can be provided by one or more of the wire feeder motors, such as current draw, voltage, power, inductance, wire feed speed, wire feed acceleration, wire feeder motor angle, torque, position, etc., which can be analyzed by the processing circuit 84 to indirectly determine one or more operational characteristics. This process can be implemented in conjunction with the sensors 70 or without to achieve a similar result.

The processing circuit 84 will also be associated with memory circuitry 86 which may consist of one or more types of permanent and temporary data storage, such as for providing the welding sequences implemented, storing the three-dimensional and thermal models, storing operational characteristics, storing weld settings, storing error logs, etc. The adjustment of the operational characteristics can be made by reference and/or comparison to historical data from preceding additive manufacturing operations, which can also be stored on memory circuit 86. For instance, adjustment may be made on the basis of stored data based on a historical analysis of a similar additive manufacturing operation. The historical data can correspond to, for example, operational parameters, other sensor data, a user input, as well as data related to trend analysis, threshold values, profiles associated with a particular mode of operation, etc., and can be stored in a comparison chart, list, library, etc., accessible to the processing circuit 84.

Accordingly, as described above, sensed current and or voltage, and the known inputs include wire type and wire diameter, the processing circuit 84 may receive sensor data including voltage and/or current. The processing circuit 84 may retrieve known inputs including wire type and wire diameter from the memory circuit 86. In some examples, the known inputs are received from the operator interface 20, 34. Using a resistance model 402 that may be retrieved from the memory circuit 86 based on the wire type and/or wire diameter, the control circuitry 22 or 32 can determine the height d between the contact tip 66 and the workpiece 18 and control the robotic system 72 to adjust the height d. Thus, a stable LMD-HW process may be accomplished with the wire 42 meeting the workpiece in a desirable location in order to avoid defects.

In some examples, the processing circuit 84 includes a timer, a speed sensor, or other sensor that may provide information regarding the additive manufacturing process, such as the amount of wire consumed, an estimate of the anticipated progress for the manufacturing process, etc. Additionally or alternatively, the control circuitry 22, 32 can be configured to monitor and/or adjust a power output characteristic (e.g., current, voltage, power, phase, etc.) associated with the power supply.

The processing circuit 84 is further configured to control the laser system 60 and laser generator 62. The processing circuit 85 provides control signals to the laser system 60 to adjust in response to information corresponding to an amount of wire between the two wire feeder motors. In particular, the sensors 70 can monitor one or more characteristics of the laser system 60, the tool 16, the power supply output, and/or the part 78 (e.g., the weld puddle size, shape, temperature, location of the electrode wire and/or the cathode spot on the weld puddle, etc.), and provide data to the processing circuit 84 for analysis and determination.

A second relationship between enthalpy H and torch 16 height d may also be used to determine and control the height d. The additive manufacturing system of FIG. 1 may include an enthalpy control system that maintains a constant enthalpy of the wire 42. An example enthalpy control system is described in U.S. Patent Application Publication No. 2015/0088302, by Kevin Michael Scott and Richard Martin Hutchison, titled "Hotwire Deposition Material Processing System and Method." The constant enthalpy control system may be implemented on control circuitry 22 or 32. U.S. Patent Application Publication No. 2015/0088302 is incorporated by reference herein in its entirety.

The relationship between height d and enthalpy is shown in equation 8 below, where $H_f$ is the final enthalpy, $H_o$ is the initial enthalpy, $\rho$ is the resistivity of the wire, $\rho_w$ is density of the wire material at room temperature, $d_w$ is the wire diameter, $\theta$ is the incident angle between the wire 42 and the workpiece 18, $v_f$ is the wire feed speed, and I is the current. If the enthalpy $(H_f-H_0)$ is controlled to be constant (see equation 9, below), then equation 10 below shows the relationship between instantaneous height $d_i$, current I, and incident angle $\theta$.

$$d = \frac{1}{I^2} \frac{(H_f - H_0)(\pi d_w^2/2)^2 v_f \rho_w}{\rho} \sin\theta \quad \text{Equation 8}$$

$$K' = \frac{(H_f - H_0)(\pi d_w^2/2)^2 v_f \rho_w}{\rho} \quad \text{Equation 9}$$

$$d_i = \frac{1}{I_i^2} K' \sin\theta \quad \text{Equation 10}$$

Figure 6:
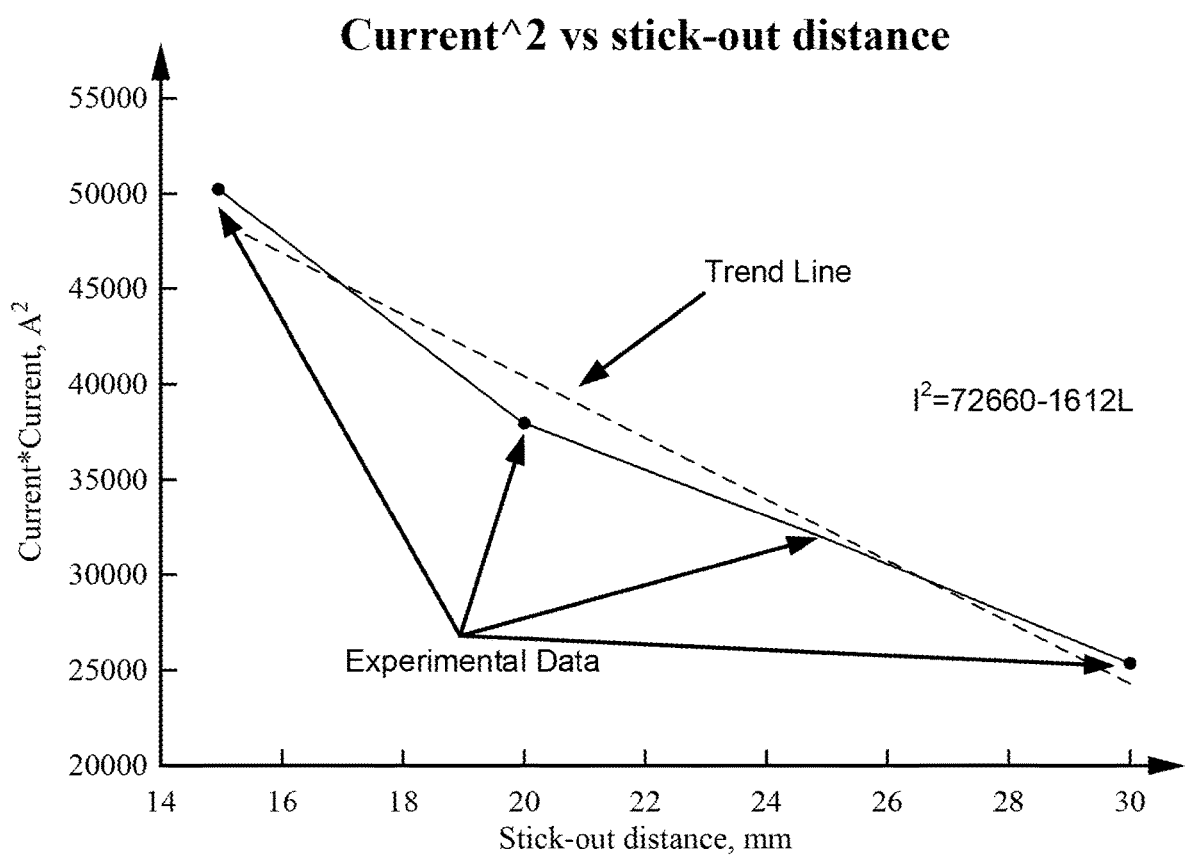
FIG. 6 is a graphical diagram showing an exemplary relation between current and wire stick-out distance.

Based on the calculated outputs, the control circuitry 22 or 32 adjusts the current I to maintain a constant enthalpy in the wire 42. Because of the relationship between the current I and the height, the control circuitry 22 or 32 can determine the height d based on the known current and incident or torch angle $\theta$. For various wire types, several presets are needed to determine the constant K'. For example, for ER 70S low carbon steel filler wire, the relationship between 1 and I has been experimentally determined via a trend line, as shown in equation 11 below and FIG. 6. Such a trend line can be determined via plotting the stick-out distance versus the measured current I squared for a certain wire type, and determining an equation for the estimated line that runs through the experimental data.

$$K'=72660I-1612I^2 \quad \text{Equation 11}$$

Figure 7A:
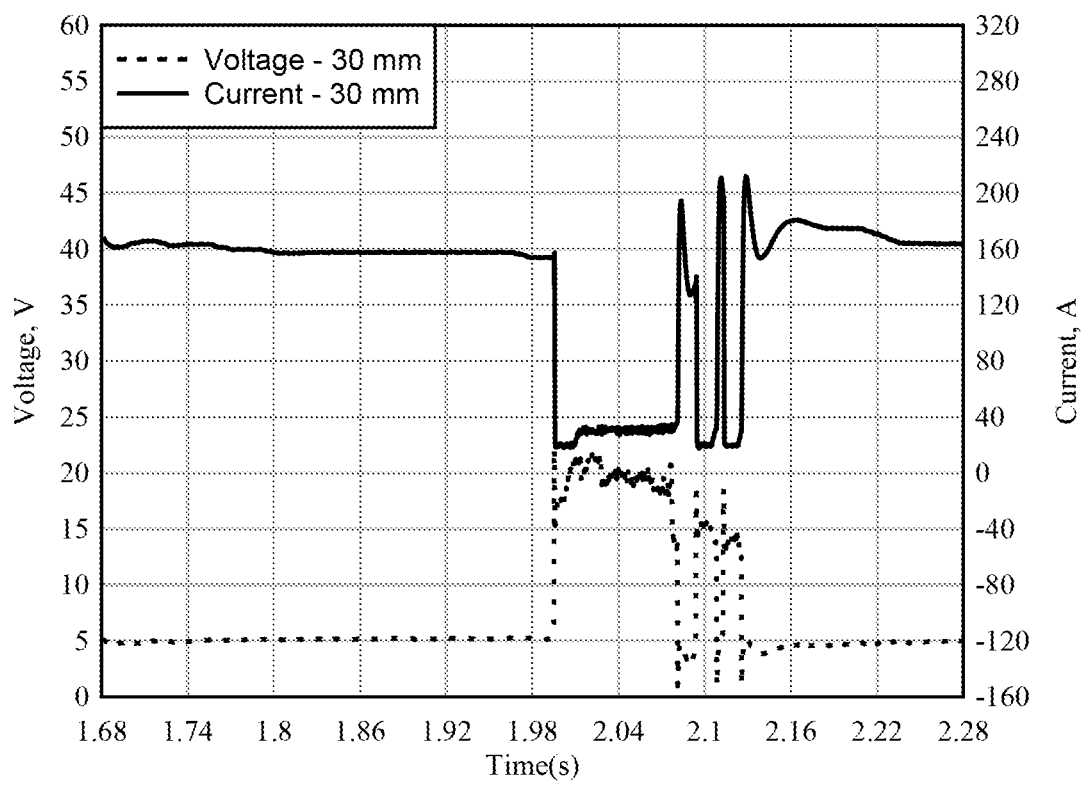
FIG. 7a is a graphical time diagram showing an exemplary current and voltage reaction to a disturbance.

In actual welding processes, start and stop points as well as disturbances from the wire or weld puddle may disrupt the constant enthalpy control and therefore the stability of the process. Because the enthalpy control is a closed loop system, the enthalpy control stabilizes quickly after disturbances, as shown in the experimental example of FIG. 7a. FIG. 7a shows an example current and voltage response to a disturbance.

At brief occasions of instability caused by disturbances, height control may not be necessary. To filter out the disturbances, the control circuitry 22 or 32 may set maximum current and/or voltage change criteria, whereby the control circuitry 22 or 32 will not control the robotic system 72 to adjust the height d if the current and/or voltage change rate exceeds a threshold change rate. Example criteria may be $$\frac{di}{dt} < 5000 \text{ amps per second and/or}$$

$$\frac{dU}{dt} < 2500 \text{ volts per second.}$$

Figure 7B:
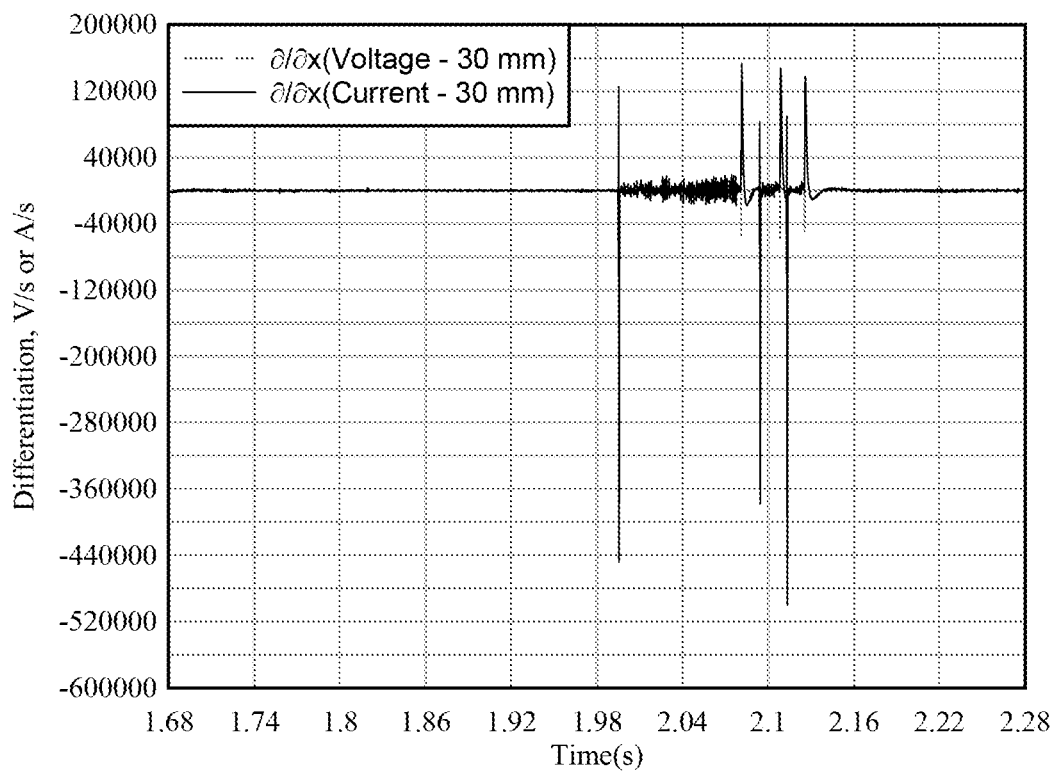
FIG. 7b is a graphical time diagram showing an exemplary current and voltage rate of change after a disturbance.

FIG. 7b shows an exemplary experimental rate of change of the current I and the voltage U over time that corresponds to the disturbance of FIG. 7a.

Figure 8:
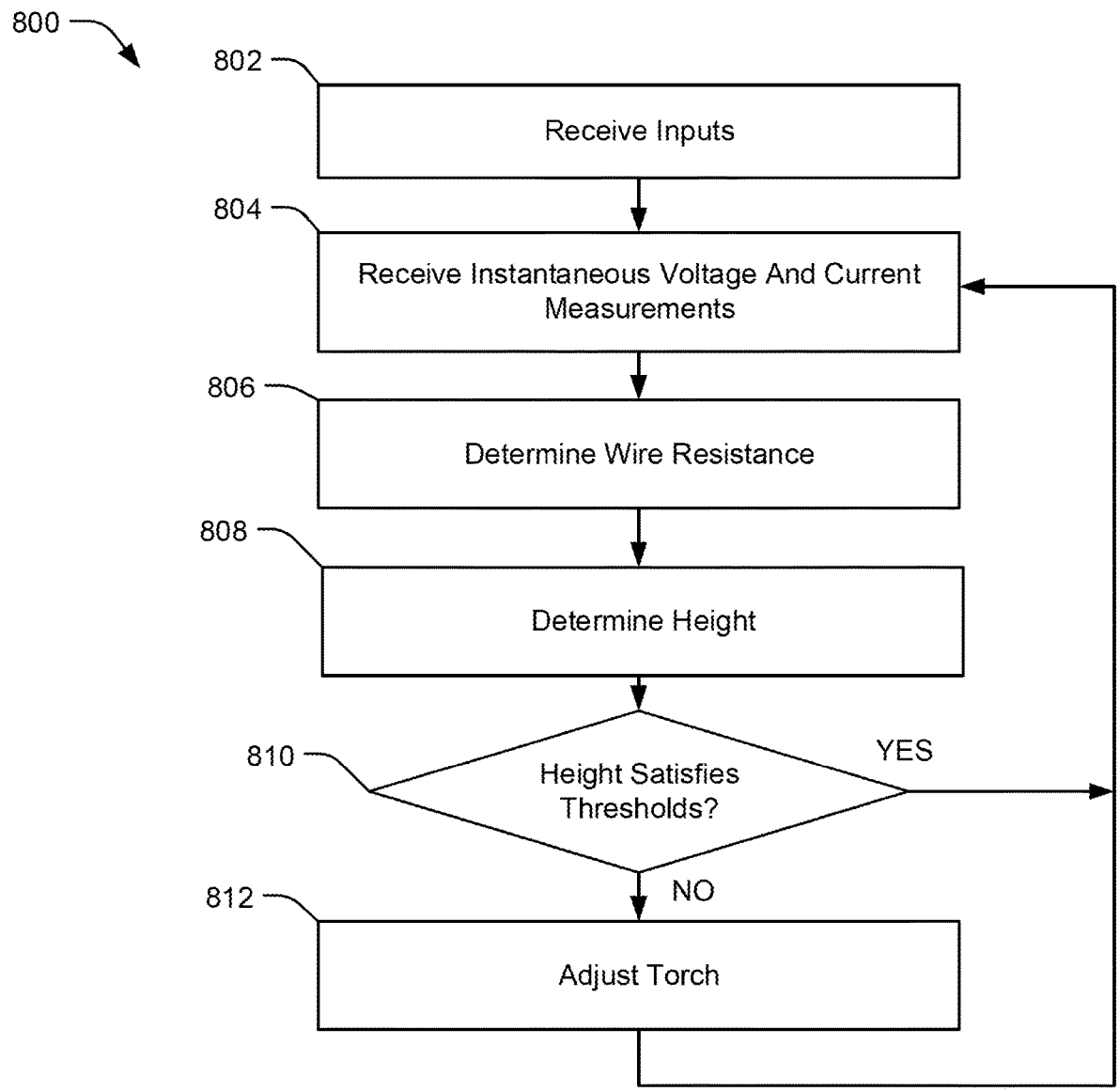
FIG. 8 illustrates a method of controlling a height of a welding torch based on a determined resistance of the stick-out welding wire.

FIG. 8 illustrates a method 800 of adjusting a height d of a torch of an additive manufacturing system with respect to a workpiece based on a determined resistance of the wire. The method 800 may be wholly or partially implemented by a control circuitry, for example the control circuitry 22 or 32 of the additive manufacturing system of FIG. 1.

At block 802, the control circuitry 22 or 32 receives inputs regarding the wire type and the torch 16 angle θ. The torch angle θ may be preprogrammed by the control circuitry 22 or 32 based on the welding process, or be measured by a mechanical sensor 106. The wire type input may be received from a memory circuit 86 or an operator interface 20 or 34. Wire type inputs include resistivity ρ and wire diameter $d_w$. The resistivity ρ and wire diameter $d_w$ may be stored in a database 88 of the memory circuit 86 for various wire types. The control circuitry 22 or 32 may retrieve the resistivity ρ and wire diameter $d_w$ based on a wire type input at the operator interface 20 or 34.

At block 804, the control circuitry 22 or 32 receives instantaneous voltage and or current measurements. In some examples, only one of current or voltage is measured by a sensor 70, and the other of current or voltage is known based on the settings of the power supply 10 for the given welding-type process. At block 806, the control circuitry 22 or 32 determines the resistance R of the wire 42 based on the measured current and/or voltage received at block 804.

At block 808, the control circuitry uses the determined resistance R and the inputs received at block 802 to determine the instantaneous torch 16 height $d_i$ based on the relationship between resistance and height, where $$d_i = (K)(\sin(\theta))\left(\frac{U_i}{I_i}\right) = (K)(\sin(\theta))(R_i) \quad \text{Equation 12}$$

$$\frac{\pi(d_w/2)^2}{\rho} = K \quad \text{Equation 13}$$

At block 810, the control circuitry 22 or 32 compares the determined instantaneous height $d_i$ to one or more threshold values (e.g., a first, low threshold height value and a second, high threshold height value). If the instantaneous height $d_i$ satisfies the one or more threshold values (e.g., is within the first and second threshold values at block 810), the height of the torch 16 is unchanged, and the process returns to block 804 as the control circuitry 22 or 32 continues monitoring the instantaneous voltage and current.

If the instantaneous height $d_i$ does not satisfy the one or more thresholds (e.g., below the first threshold height value or above the second threshold height value) then at block 812 the control circuitry 22 or 32 controls the robotic system 72 to adjust the height of the torch 16 in order to bring height $d_i$ to within the first and second threshold height values (i.e. to $d_{desired}$), where $d_{desired}$ may be a value stored in the memory circuit 86. After adjusting the height of the torch 16 at block 812, the control circuitry 22 or 32 returns to block 804 to continue monitoring the instantaneous voltage and current.

The first and second thresholds are threshold heights at which the stick-out wire 42 is within a desirable distance from the weld puddle for a given torch angle θ, as shown in FIG. 2a. If, for example, the height $d_i$ falls below the first threshold, the contact point 81 between the stick-out wire 42 and the workpiece 18 may be too far from the weld puddle, as shown in FIG. 2c, which can cause instability. If the height $d_i$ is above the second threshold, then the wire 42 meets the weld puddle within the laser beam 64 as shown in FIG. 2b. Accordingly, method 800 may be executed to control the instantaneous height $d_i$ to maintain the contact point 81 of the wire at a desirable distance from the weld puddle.

Figure 9:
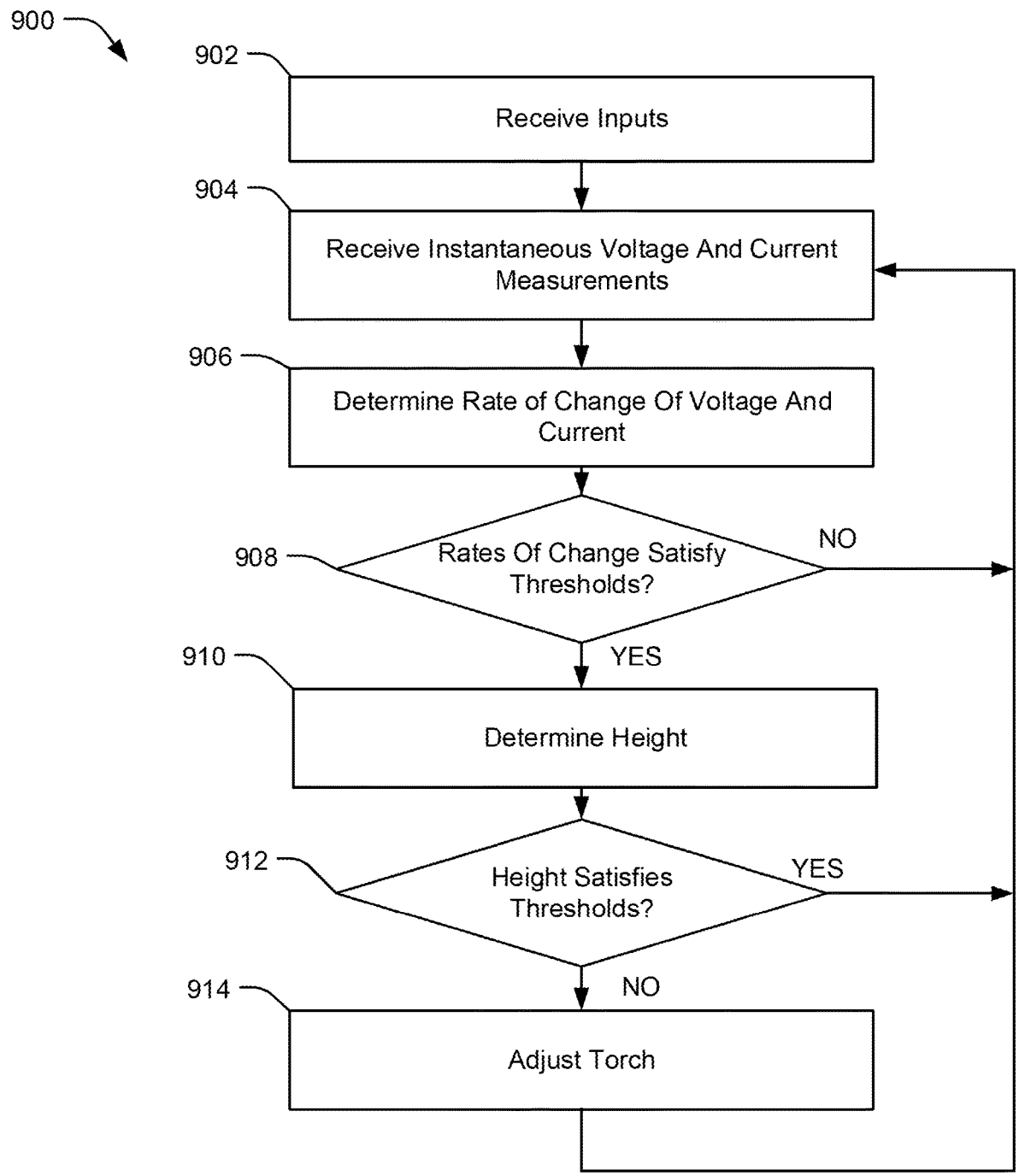
FIG. 9 illustrates a method of controlling a height of a welding torch based on a determined current through the welding wire based on a constant enthalpy of the welding wire.

FIG. 9 illustrates a method 900 of forming adjusting a height d of a torch of an additive manufacturing system with respect to a workpiece based on a current when the enthalpy of the wire is controlled to be constant. The method 900 may be wholly or partially implemented by a control circuitry, for example, the control circuitry 22 or 32 of the additive manufacturing system of FIG. 1.

At block 902, the control circuitry 22 or 32 receives inputs, including a constant K' for the given welding wire type and wire feed speed, and a torch angle θ. A user may input the wire type and wire feed speed into an operator interface 20 or 34. The constant K' may be stored in a database 88 of the memory circuit for various wire types and feed speeds. The torch angle θ may be preprogrammed by the control circuitry 22 or 32 based on the welding process, or be measured by a mechanical sensor 106.

At block 904, the control circuitry 22 or 32 receives instantaneous voltage and current measurements from voltage sensor 108 and current sensor 110. The control circuitry 22 or 32 then saves the instantaneous current and voltage measurements in the memory circuit 86. At block 906, the control circuitry 22 or 32 determines the rate of change of the instantaneous voltage and current. For example, the control circuitry 22 or 32 computes the difference between the instantaneous voltage and current received in block 904 and the most recent previously received instantaneous voltage and current received from the voltage sensor 108 and the current sensor 108, which are stored in the memory circuit 86. The control circuitry 22 or 32 then divides the voltage and current differences by the amount of time that has passed between the samples to determine the rate of change of the voltage $$\frac{dU}{dt}$$

and the rate of change of the current $$\frac{di}{dt}.$$

At block 908, the control circuitry 22 or 32 compares the rates of change $$\frac{dU}{dt} \text{ and } \frac{di}{dt}$$

to threshold rates of change. If the rates of change do not satisfy the thresholds (block 908), then the control circuitry 22 or 32 returns to block 904 to continue to monitor the instantaneous voltage and current because the large rates of change indicate that a disturbance has occurred, as explained above with respect to FIGS. 7a and 7b.

If the rates of change do satisfy the threshold (block 908), then at block 910, the control circuitry 22 or 32 determines the instantaneous height $d_i$ based on the measured instantaneous current $I_i$, the constant K', and the torch angle θ. Specifically, as discussed above, according to equation 14:

$$d_i = \frac{1}{I_i^2} K' \sin\theta.$$ Equation 14

At block 912, the control circuitry 22 or 32 compares the determined instantaneous height $d_i$ to one or more threshold values. If the instantaneous height $d_i$ satisfies the one or more threshold values (block 912), the height of the torch 16 is unchanged, and the process returns to block 904 as the control circuitry 22 or 32 continues monitoring the instantaneous voltage and current.

If the instantaneous height $d_i$ does not satisfy the one or more thresholds, then at block 914 the control circuitry 22 or 32 controls the robotic system 72 to adjust the height of the torch 16 in order to bring height $d_i$ to within the first and second threshold height values (i.e. to $d_{desired}$), where $d_{desired}$ is a value stored in the memory circuit 86. After adjusting the height of the torch 16 at block 914, the control circuitry 22 or 32 returns to block 904 to continue monitoring the instantaneous voltage and current.

The first and second thresholds in blocks 912 and 916 are threshold heights at which the wire 42 is within a desirable distance from the weld puddle for a given torch angle θ, as shown in FIG. 2a. If the height $d_i$ falls below the first threshold, the contact point 81 may be too far from the weld puddle, as shown in FIG. 2c, which can cause instability. If the height $d_i$ is above the second threshold, then the wire 42 meets the weld puddle within the laser beam 64 as shown in FIG. 2b. Accordingly, method 800 may be executed to control the instantaneous height $d_i$ to maintain the contact point 81 of the wire at a desirable distance from the weld puddle.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

The invention claimed is:

1. An additive manufacturing system, comprising:
an additive manufacturing tool configured to advance an electrode wire to a weld puddle on a surface of a workpiece;
a heater configured to preheat the electrode wire at a location in an electrode wire feed path that is prior to the surface;
a laser generator to provide a laser beam to create and heat the weld puddle to at least a melting temperature of the electrode wire; and
a control circuitry configured to:
monitor a current or a voltage associated with the electrode wire;
determine a resistance of the electrode wire based in part on the current or the voltage;
determine a linear distance normal to the surface between the tool and the surface based in part on the resistance, wherein the tool is oriented at a non-normal angle relative to the surface; and
control a position of the tool to adjust the linear distance between the tool and the surface based on the resistance.

2. The system of claim 1, the control circuitry further configured to:
compare the distance against one or more threshold distances; and
control the position of the tool based the comparison.

3. The system of claim 2, wherein the one or more threshold distances are based on a predetermined range of angles measured between the electrode wire and the surface of the workpiece.

4. The system of claim 3, wherein the predetermined range of angles includes a 45-degree angle.

5. The system of claim 3, wherein the determined resistance corresponds to a resistance of a length of the electrode wire that extends from the contact tip to the surface.

6. The system of claim 1, wherein the resistance is determined based on a wire type of the electrode wire and a wire diameter of the electrode wire.

7. The system of claim 1, wherein the resistance is determined based on a wire temperature of the electrode wire.

8. The system of claim 1, wherein the surface is an exposed surface of a layer of a multi-layer part being formed by the additive manufacturing system.

9. The system of claim 1, wherein the additive manufacturing tool comprises a contact tip, the linear distance being normal to the surface between the contact tip and the surface.

10. The system of claim 9, the control circuitry further configured to determine a length of the electrode wire that extends from the contact tip to the surface.

11. The system of claim 10, the control circuitry further configured to control the position or an orientation of the tool to adjust the linear distance between the tool and the surface based on the length.

12. The system of claim 1, wherein the control circuitry is further configured to:
receive one or more three-dimensional models of a multi-layer part; and
adjust an operational characteristic of the system based on one or more of the three-dimensional models.

13. The system of claim 12, wherein the operational characteristic comprises a wire feed speed, a wire feed direction of the wire feeder motor, a travel speed, a power output, a process mode, a deposition path, a deposition sequence, or a tool angle, based on one or more of the three-dimensional models.

14. A manufacturing system to perform a welding or cladding operation, the system comprising:
a manufacturing tool configured to advance an electrode wire to a weld puddle on a surface of a workpiece;
a heater configured to preheat the electrode wire at a location in an electrode wire feed path that is prior to the surface;
a laser generator to provide a laser beam to create and heat the weld puddle to at least a melting temperature of the electrode wire; and
a control circuitry configured to:
monitor a current or a voltage associated with the electrode wire;
determine a resistance of the electrode wire based in part on the current or the voltage;
determine a linear distance normal to the surface between the tool and the surface based in part on the resistance, wherein the tool is oriented at a non-normal angle relative to the surface; and
control a position of the tool to adjust the linear distance between the tool and the surface based on the resistance.

15. The system of claim 14, wherein the control circuitry is further configured to:
compare the linear distance to one or more threshold distance values associated with a desired current or voltage value;
determine a distance error value based on the comparison; and
adjust the linear distance between the tool and the surface to reduce the distance error value.

16. The system of claim 15, wherein the additive manufacturing tool comprises a contact tip, the linear distance being normal to the surface between the contact tip and the surface, the control circuitry further configured to:
determine a length of the electrode wire that extends from the contact tip to the surface; and
control a position or an orientation of the tool to adjust the linear distance between the tool and the surface based on the length.

17. An additive manufacturing system, comprising:
an additive manufacturing tool configured to advance an electrode wire to a weld puddle on a surface of a workpiece;
a heater configured to preheat the electrode wire at a location in an electrode wire feed path that is prior to the surface;
a laser generator to provide a laser beam to heat the weld puddle to at least a melting temperature of the electrode wire; and
a closed loop control circuitry to maintain an enthalpy value in a portion of the electrode wire between the tool and the surface within a predetermined threshold enthalpy value, the control circuitry configured to:
determine a desired current to maintain the enthalpy value within the predetermined threshold enthalpy value at a threshold distance of the tool from the surface;
calculate a current error value based on a comparison of a current feedback signal and the desired current; and
adjust a linear distance of the tool normal to the surface of the workpiece to reduce the current error value, wherein the tool is oriented at a non-normal angle relative to the surface.

18. The system of claim 17, wherein the predetermined threshold enthalpy value is based on one or more operating characteristics of the system.

19. The system of claim 17, wherein the one or more operating characteristic is determined based upon an operator input.

20. The system of claim 17, wherein the one or more operating characteristic comprises a welding process or an electrode wire type.

21. The system of claim 17, wherein the control circuitry is further configured to adjust the angle of the tool relative to the surface to reduce the current error value.

* * * * *